United States Patent
Sasaki et al.

(10) Patent No.: US 10,003,288 B2
(45) Date of Patent: Jun. 19, 2018

(54) MOTOR CONTROL CIRCUIT AND FAN INCLUDING THE SAME

(71) Applicant: ROHM CO., LTD., Kyoto (JP)

(72) Inventors: Hikaru Sasaki, Kyoto (JP); Kenji Asai, Kyoto (JP); Yuki Gohara, Kyoto (JP); Masateru Moroizumi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days. days.

(21) Appl. No.: 15/422,701

(22) Filed: Feb. 2, 2017

(65) Prior Publication Data

US 2017/0222584 A1 Aug. 3, 2017

(30) Foreign Application Priority Data

Feb. 3, 2016 (JP) ................................. 2016-018955

(51) Int. Cl.
*H03M 1/12* (2006.01)
*H02P 6/16* (2016.01)
*H02P 27/08* (2006.01)

(52) U.S. Cl.
CPC ................ *H02P 6/16* (2013.01); *H02P 27/08* (2013.01)

(58) Field of Classification Search
CPC ... H02P 6/16; H02P 6/08; H03M 1/00; H03M 1/12; H03M 1/66
USPC ... 318/400.01, 700, 701, 727.799, 432, 599; 341/110, 114, 128, 129, 141, 155, 180, 341/187, 189
See application file for complete search history.

(56) References Cited

U.S. PATENT DOCUMENTS

| 5,349,351 A * | 9/1994 | Obara ................. H03M 1/1225 318/599 |
| 5,579,194 A * | 11/1996 | MacKenzie .......... H01H 47/325 341/128 |
| 6,486,809 B1 * | 11/2002 | Figoli ................. H03M 1/1225 341/141 |

(Continued)

FOREIGN PATENT DOCUMENTS

JP H03-243193 10/1991
JP H03-277194 12/1991

OTHER PUBLICATIONS

Toshiba Corporation, "Motor Control Possible so Far with Cortex-M Microcomputer" (2012) (36 pages and English-language translation of p. 17).

(Continued)

*Primary Examiner* — Antony M Paul
(74) *Attorney, Agent, or Firm* — Fish & Richardson P.C.

(57) ABSTRACT

A control circuit for a motor, includes: a plurality of m number of analog ports to each of which a detection signal indicating an electrical state of the motor is input, m being an integer of 2 or more; an A/D converter including a multiplexer to receive detection signals of the m number of analog ports and being configured to convert a detection signal selected by the multiplexer into digital data; a processor to generate a drive command of the motor based on the digital data; a pulse width modulator to perform pulse width modulation to generate a PWM signal based on the drive command; and an interface circuit to be triggered by at least one internal signal generated in the control circuit to control an operation of the A/D converter according to a control command from the processor and deliver the digital data to the processor.

21 Claims, 11 Drawing Sheets

(56) References Cited

U.S. PATENT DOCUMENTS

| | | | | |
|---|---|---|---|---|
| 6,949,900 B1 * | 9/2005 | Berringer | ............... | H02P 6/08 |
| | | | | 318/400.03 |
| 7,663,520 B2 * | 2/2010 | Sugihara | ............... | H02P 6/18 |
| | | | | 341/112 |
| 7,852,032 B2 * | 12/2010 | Azuma | ............... | H03K 7/08 |
| | | | | 318/569 |
| 9,106,167 B2 * | 8/2015 | Petri | ............... | H02P 6/182 |
| 2012/0235842 A1 * | 9/2012 | Douzane | ............... | G05B 11/28 |
| | | | | 341/120 |

OTHER PUBLICATIONS

"Motor Control Possible so Far with Cortex-M Microcomputer," Toshiba Corporation, 36 pages (2012).

\* cited by examiner

MOTOR CONTROL CIRCUIT AND FAN INCLUDING THE SAME

CROSS-REFERENCE TO RELATED APPLICATION

This application is based upon and claims the benefit of priority from Japanese Patent Application No. 2016-018955, filed on Feb. 3, 2016, the entire contents of which are incorporated herein by reference.

TECHNICAL FIELD

The present disclosure relates to a motor control circuit.

BACKGROUND

A square wave drive, a sinusoidal wave drive, a vector control and so on are known as motor drive systems. Among them, the vector control resolves a coil current of a motor into a d-axis component and a q-axis component, which are orthogonal to each other and are individually controlled. The vector control may be said to be one type of the sinusoidal wave drive. The vector control is complicated although it has an advantage of high control efficiency.

The square wave drive and the sinusoidal wave drive can be realized only with hardware such as an analog circuit or a digital circuit. On the other hand, in case of the vector control, since it is difficult to construct a control circuit only with hardware due to its complexity of the vector control, it generally relies on a software control by a combination of a processor (microcomputer) and a program.

In order to properly drive a motor, information on a mechanical state (a rotational speed and a rotor position) of the motor is required. The mechanical state of the motor can be detected by a rotation sensor such as a rotary encoder or a resolver. Alternatively, in a sensorless system, it is necessary to estimate the mechanical state of the motor based on an electrical state (a coil current and/or a coil voltage of the motor) of the motor and generate a drive control signal based on the estimated state.

FIG. 1 is a block diagram of a motor driver 4R which uses a software control. Here, sensorless drive is taken as an example. A motor 2 is a three-phase brushless motor. The motor driver 4R mainly includes a three-phase inverter 6 and a motor control circuit 10R.

The motor control circuit 10R mainly includes an A/D converter module 12, a processor 14 and a pulse width modulator 16. The A/D converter module 12 converts an analog detection signal S1 corresponding to the electrical state of the motor 2, in other words, a coil current or a coil voltage of the motor 2, into a digital detection signal S2. For example, the inverter 6 is provided with sense resistors $Rs_U$, $Rs_V$ and $Rs_W$ for detecting currents of U phase, V phase and W phase (which is referred to as a three-shunt configuration). In each sense resistor Rs, a voltage drop proportional to the coil current of the corresponding phase occurs. The voltage drops of the sense resistors $Rs_U$ to $Rs_W$ are input to the A/D converter module 12 via a plurality of analog ports. In addition, other analog signals (not shown) may be input to the A/D converter module 12.

Based on the digital detection signal S2 from the A/D converter module 12, the processor 14 generates a drive control signal (for example, a command value of a three-phase voltage) S3 of the motor 2. The processor 14 is configured to execute a program 18 described by a user in advance.

The pulse width modulator 16 generates a control signal S4 of the inverter 6 by performing a pulse width modulation (PWM) of the drive control signal S3. The inverter 6 is switched according to the control signal S4 from the pulse width modulator 16.

A function required of the motor control circuit 10R varies depending on a type of the motor 2 to be combined, a drive type of the motor 2 to be combined and an application of the motor 2 to be combined. For example, in addition to the three-shunt configuration shown in FIG. 1, there is a one-shunt configuration in which one sense resistor is shared by three phases, as a current detection system. The A/D converter processes three current detection signals in the three-shunt configuration and processes one current detection signal in the one-shunt configuration. Further, those two configurations are different from each other in terms of a proper timing of the A/D conversion.

If the motor control circuit 10R may have various applications, drive formats, and versatility and flexibility with which it may be used in combination with a motor, the number of types of products may be reduced, which is advantageous for vendors of the motor control circuit 10R from the viewpoint of a development cost and an inventory management. Further, even for purchasers (users) of the motor control circuit 10R, if it is possible to cope with various applications, driving formats and motors by using a common hardware (that is, the motor control circuit 10R) and modifying a software (that is, the program 18), a development period of various devices 1 equipped with the motor 2 may be shortened.

The present inventors have studied the motor control circuit 10R in the related art and have recognized the following problems. In other words, in the motor control circuit 10R, an order and a timing of the A/D conversion by the A/D converter module 12 and the analog ports to be subjected to the A/D conversion cannot be set and controlled by software freely, which is one of obstacles to increase the versatility and the flexibility of the motor control circuit 10R.

SUMMARY

The present disclosure provides some embodiments of a motor control circuit which is capable of providing an easy and flexible software control.

According to one embodiment of the present disclosure, there is provided a control circuit for a motor, the control circuit including: a plurality of m number of analog ports to each of which a detection signal indicating an electrical state of the motor is input, m being an integer of 2 or more; an A/D converter including a multiplexer configured to receive detection signals of the m number of analog ports and convert the detection signal selected by the multiplexer into a digital data; a processor configured to generate a drive command of the motor based on the digital data; a pulse width modulator configured to perform a pulse width modulation to generate a PWM signal based on the drive command; and an interface circuit configured to be triggered by at least one internal signal generated in the control circuit to control an operation of the A/D converter according to a control command from the processor and deliver the digital data to the processor. According to the embodiment, various events occurring in hardware can be used for timing control of the A/D converter.

The interface circuit may include: a timing signal generation circuit configured to generate a timing signal based on the at least one internal signal; and an access controller configured to control a timing of the A/D converter in response to the timing signal.

The at least one internal signal may include the PWM signal generated in the pulse width modulator. The at least one internal signal may include a full-phase PWM signal generated in the pulse width modulator. The at least one internal signal may include an inversion signal of the full-phase PWM signal.

The at least one internal signal may include a peak/bottom detection signal which has a predetermined level for one cycle at each of a peak and a bottom of a triangular wave used for the pulse width modulation. Thus, the operation of the A/D converter may be synchronized with a PWM cycle.

The interface circuit may further include a peak/bottom pulse generator configured to receive the peak/bottom detection signal and generate a pulsed peak/bottom pulse which transitions at each of the peak and the bottom of the triangular wave. Thus, by referring to the peak/bottom pulse, peak and bottom events can be handled in the same manner as U-phase ON, U-phase OFF, V-phase ON, V-phase OFF, W-phase ON and W-phase OFF represented by other PWM signals.

The at least one internal signal may include a pulsed peak/bottom pulse which transitions at each of the peak and the bottom of a triangular wave used for the pulse width modulation.

The interface circuit may further include an error detector configured to detect, as an event error, a trigger generated for newly starting an A/D conversion during a conversion by the A/D converter. Thus, it is possible to quickly detect at a hardware level that unintended control is being performed.

The interface circuit may further include: a timing signal generation circuit configured to generate a start timing signal based on a start event signal which is one of the at least one internal signal; and an access controller configured to control the A/D converter by using the start timing signal as a trigger for operation start of the A/D converter. The access controller may use the start timing signal as the trigger for the operation start of the A/D converter in a hardware mode. In the hardware mode, a control cycle of the A/D converter can be synchronized with a state of the control circuit.

The interface circuit may further include: a run register (RUN); and a mode start register (MODE_START) configured to store a value designating one of a software mode and a hardware mode. The access controller may (1) use an assertion of the run register as the trigger for the operation start of the A/D converter in the software mode and (ii) use the start timing signal as the trigger for the operation start of the A/D converter in the hardware mode. In the present specification, "assertion of a register" corresponds to a situation in which a predetermined value (for example, 1) is written in the register. Thus, the A/D converter may be triggered by a software control independently of a state of hardware.

The interface circuit may further include: an event selection register (EVENT_SEL); and an event selector configured to receive a plurality of internal signals, select one of the plurality of internal signals corresponding to a value stored in the event selection register and output the start event signal. The timing signal generation circuit may generate the start timing signal based on the start event signal. Thus, it is possible to control an internal signal (that is, an event) which triggers the operation start, using a software.

The interface circuit may further include a delay setting register (EVENT_DELAY_SEL and EVENT_DELAY_EN) configured to store a setting value of a delay time from an assertion of the start event signal to an assertion of the start timing signal in the hardware mode. The timing signal generation circuit may include a delay circuit configured to provide a delay corresponding to the setting value of the delay setting register to the start event signal and output the start timing signal. In the present specification, "assertion of a signal" corresponds to a transition of the signal to a predetermined level, and, from another viewpoint, corresponds to an occurrence of a predetermined edge of the signal. Thus, it is possible to finely control a timing of the operation start using software.

One control cycle of the A/D converter by the interface circuit may include k times ($1 \leq k \leq n$) of the A/D conversion with n as a maximum, the n being an integer of 2 or more. The interface circuit may further include: a timing signal generation circuit configured to generate a conversion timing signal based on a conversion event signal corresponding to one of the at least one internal signal for each A/D conversion; and an access controller configured to control the A/D converter with the conversion timing signal as an A/D conversion trigger for each A/D conversion. The access controller may perform each A/D conversion k times with the corresponding conversion timing signal as a trigger in a sequential mode. Thus, the timing of the A/D conversion may be controlled based on the state of hardware.

The interface circuit may further include: n number of individual event selection registers (EVENT_SEL0 to EVENT_SELn−1), each of which is configured to store a value individually designating an internal signal to be a trigger for each of the maximum n times of the A/D conversion; and an event selector configured to receive the plurality of internal signals, select one of the plurality of internal signals corresponding to a value stored in the corresponding one of the n number of individual event selection registers for each A/D conversion, and output a conversion event signal. The timing signal generation circuit may generate the conversion timing signal based on the conversion event signal for each A/D conversion in the sequential mode. Thus, events to be triggered can be set independently and individually every conversion.

The interface circuit may further include a delay setting register (EVENT_DELAY_SEL0 to EVENT_DELAY_SELn−1 and EVENT_DELAY_EN0 to EVENT_DELAY_ENn−1) configured to store a setting value of delay time from an assertion of the conversion event signal to an assertion of the conversion timing signal for each of the maximum n times of the A/D conversion. The timing signal generation circuit may include a delay circuit configured to provide a delay according to the corresponding setting value of the delay setting register to the corresponding conversion event signal for each A/D conversion and output the conversion timing signal. Thus, it is possible to finely control of a timing of the A/D conversion by software.

The interface circuit may further include a mode sequence register (MODE_SEQ) configured to store a value designating one of an auto mode and a sequential mode. The interface circuit may automatically execute k times of the A/D conversion in the auto mode. In the auto mode, it is possible to perform k times of the A/D conversion at a timing automatically generated by the interface circuit, which is useful in a situation where the timing of the A/D conversion is not so severe. In the sequential mode (a manual mode), a timing of each A/D conversion may be individually designated manually, which can cope with a severe timing control.

The interface circuit may further include a mode burst register (MODE_BURST) configured to store a value designating one of a one-time conversion mode and a continuous conversion mode. The access controller may be configured to (i) wait for the next operation start when a conversion process of one control cycle is ended in the one-time conversion mode and (ii) transition to the next control cycle without waiting for the next operation start when a conversion process of one control cycle is ended in the continuous conversion mode. More flexibility is provided by making it possible to select one of the one-time conversion mode and the continuous conversion mode.

The interface circuit may further include a register (BURST_SEL) configured to store a value designating the number of times k of conversion included in the one control cycle. Thus, a minimum conversion processing required is performed to reduce the load on a processor.

The A/D converter may be provided in each of a plurality of channels.

The control circuit may be integrated on a single semiconductor substrate. As used herein, the term "integrated" is intended to include both a case where all elements of a circuit are formed on a semiconductor substrate and a case where main elements of the circuit are integrated on the semiconductor substrate. In addition, some resistors, capacitors and the like for adjusting a circuit constant may be provided outside the semiconductor substrate.

According to another embodiment of the present disclosure, there is provided a fan including: a fan motor: and the above-described control circuit configured to drive the fan motor.

Any combinations of the above-described elements or changes of the elements and representations of the present disclosure among methods, apparatuses, systems and the like are also effective as embodiments of the present disclosure.

DETAILED DESCRIPTION (Overall Configuration)

Figure 1:
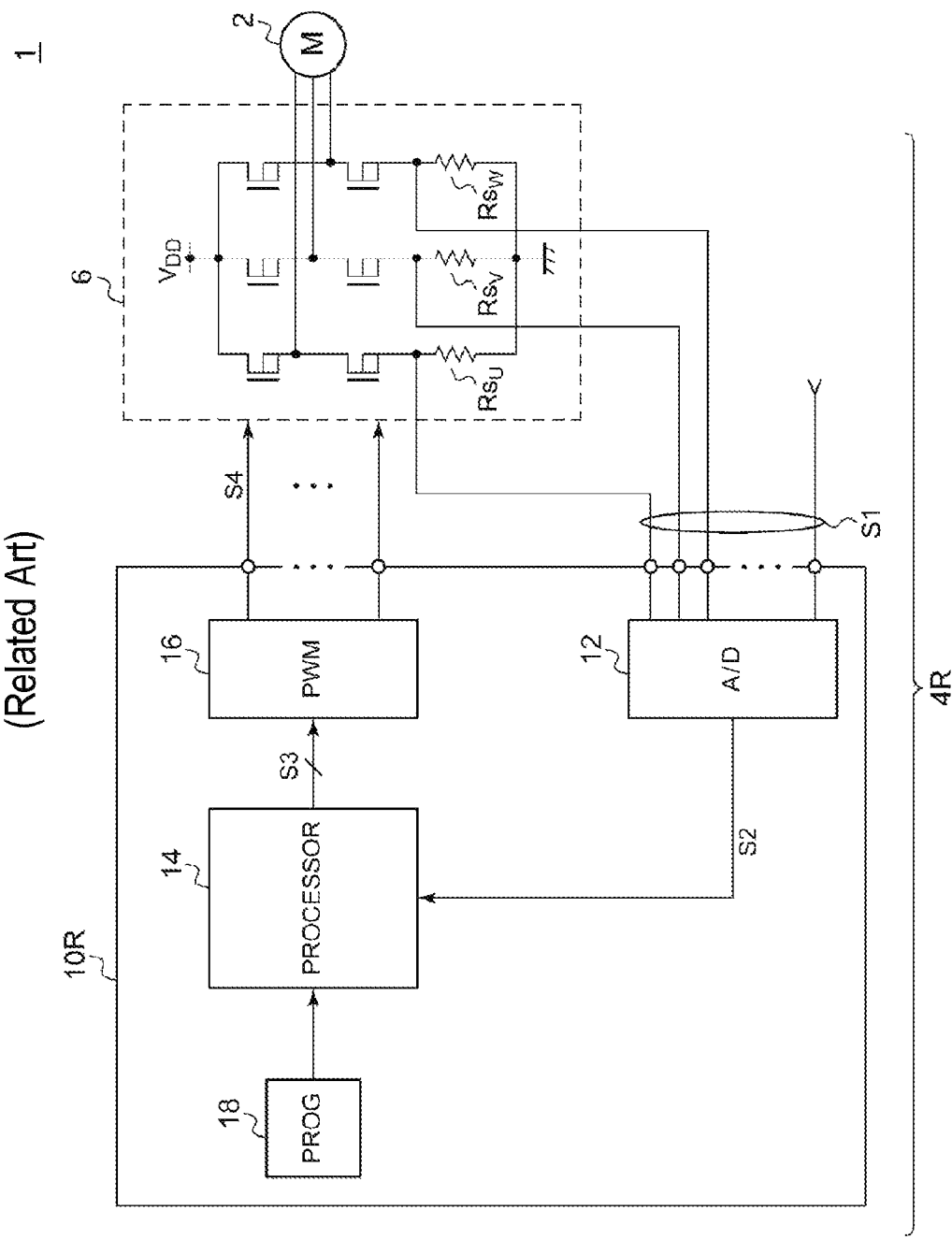
FIG. 1 is a block diagram of a motor driver using software control.
Figure 2:
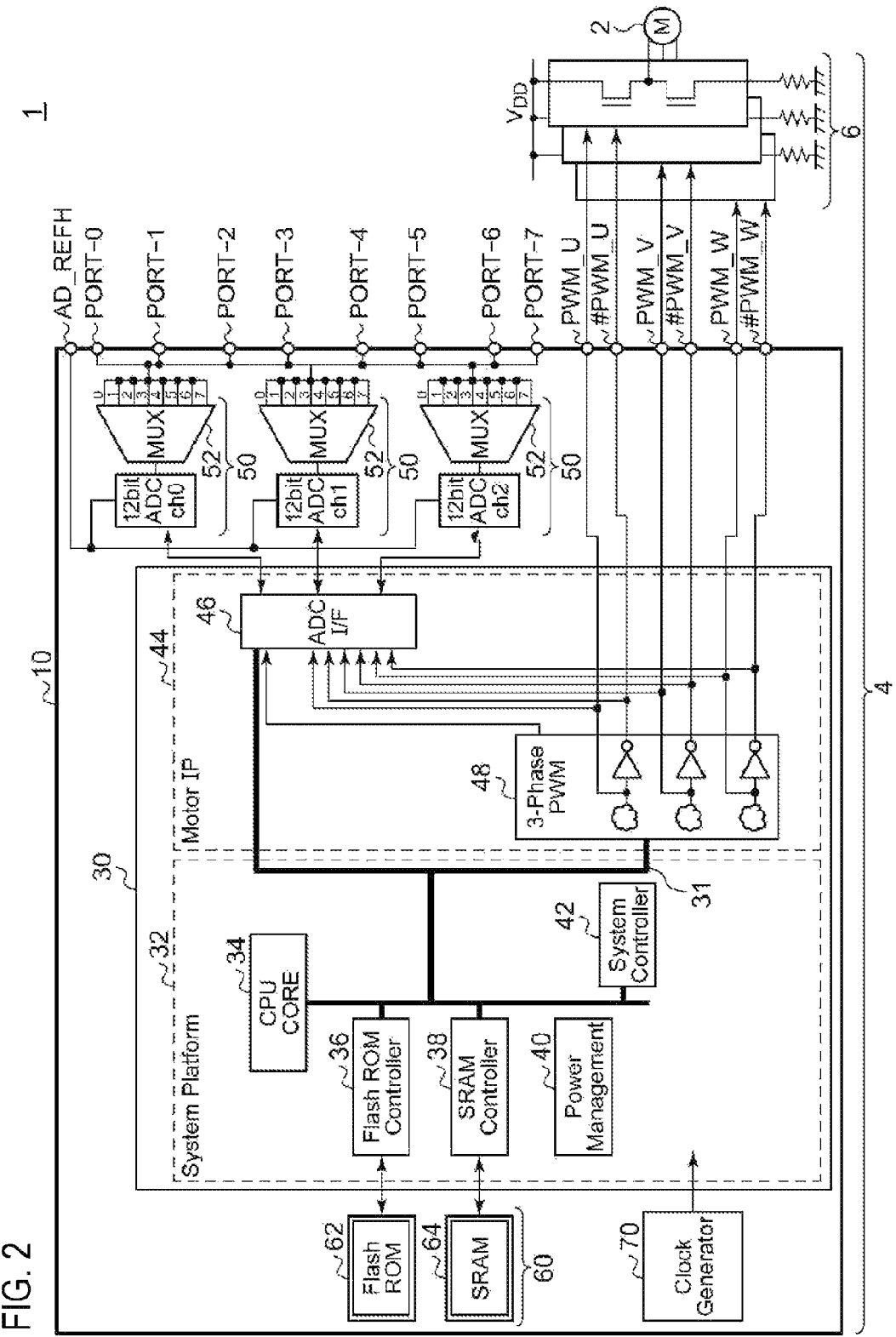
FIG. 2 is a block diagram of a driver including a control circuit according to an embodiment of the present disclosure.

FIG. 2 is a block diagram of a driver 4 including a control circuit 10 according to an embodiment of the present disclosure. The driver 4 is used for a device 1 together with a motor 2. Although the type of the device 1 is not particularly limited, the device 1 can be used in a variety of fields such as a home appliance, an OA equipment, an industrial equipment, an in-vehicle equipment, a portable electronic equipment and the like. In familiar places, the motor 2 is used for a compressor of an air conditioner, a refrigerator or the like, and cooling fans of various devices. The driver 4 includes an inverter 6 in addition to the control circuit 10. The inverter 6 includes bridge circuits (drivers) for U phase, V phase and W phase.

In this embodiment, a control target of the control circuit 10 is a three-phase brushless motor and controls the inverter 6 in a sensorless manner. Drive signals necessary for controlling a high-side switch and a low-side switch of each of the U, V and W phases are output from the control circuit 10 to the inverter 6.

The control circuit 10 is a functional IC (Integrated Circuit) integrated on a single semiconductor substrate. The control unit 10 monitors the electrical condition of the motor 2 and generates a drive signal based on a result of the monitoring. The control circuit 10 is provided with a plurality of m (m is an integer of 2 or more) analog ports PORT-0 to PORT-m−1. In this embodiment, m=8 and PORT-0 to PORT-7 are provided. A detection signal indicating the electrical state of the motor 2 can be input to each analog port. Other electrical signals, for example, an output voltage of a temperature sensor such as a thermistor, an analog voltage indicating the rotational speed of the motor 2, etc. may be input to each analog port.

In FIG. 2, a three-shunt configuration is shown, a sense resistor (a shunt resistor) $R_S$ is provided for each of the U, V and W phases, each sense resistor is assigned to one analog port, and a voltage drop across each sense resistor is input as a detection signal to the analog port to which each sense resistor is assigned. In the case of one-shunt configuration, a voltage drop of one shunt resistor is input to one analog port.

The control circuit 10 mainly includes a digital arithmetic processor 30, an A/D converter 50, a memory 60 and a clock generator 70. Blocks unrelated to the present disclosure are omitted. The A/D converter 50 includes a multiplexer 52 having its input terminals which receive detection signals of m analog ports, respectively. The A/D converter 50 converts a detection signal selected by the multiplexer 52 into digital data (conversion data) DOUT. The control circuit 10 of FIG. 2 includes the A/D converters 50 of three channels ch0 to ch2, but the number of channels is not limited thereto. A configuration and a scheme of the A/D converter 50 are not particularly limited, and, for example, a successive approximation type A/D converter may be used.

The digital arithmetic processor 30 receives the conversion data DOUT from the A/D converter 50 and generates PWM signals (PWM_U, PWM_V and PWM_W and their inverted signals #PWM_U, #PWM_V and #PWM_W) for controlling the inverter 6. A system platform 32 of the digital arithmetic processor 30 is a so-called embedded processor, and may be configured using an ARM architecture provided by ARM Company, for example. The system platform 32 incorporates memory controllers 36 and 38, a power management unit 40, a system controller 42, etc. in addition to a CPU core 34.

The memory 60 includes a non-volatile memory 62 such as a flash memory and a volatile memory 64 such as an SRAM. In the non-volatile memory 62, programs to be executed by the CPU core 34 are stored. The volatile memory 64 is used as a main memory.

A motor control block 44 of the digital arithmetic processor 30 is a circuit block peculiar to the control of the motor 2. An ADC interface (an interface circuit) 46 is an interface between the system platform 32 and the A/D converter 50 and delivers the conversion data from the A/D converter 50 to the CPU core 34. As will be described in detail later, an operation of the A/D converter 50 is software-controllable by the CPU core 34. The ADC interface 46 controls the operation of the A/D converter 50 according to a control command from the CPU core 34. The control command from the CPU core 34 to the ADC interface 46 is performed by writing in a control register which will be described later.

The system platform 32 executes the program to generate a drive command (for example, a three-phase voltage command value) for the motor 2. A pulse width modulator 48 performs a pulse width modulation on the drive command generated by the system platform 32 to generate PWM signals of the U, V and W phases and their inverted signals. A control method and an algorithm for the motor are not particularly limited, but may use well-known vector control techniques.

Blocks in the system platform 32 and blocks in the motor control block 44 are interconnected via a bus 31 so that various data and control bits may be mutually referenced or written through registers.

The overall configuration of the control circuit 10 is described above. Subsequently, the ADC interface 46 will be described.

(ADC Interface)

Figure 3:
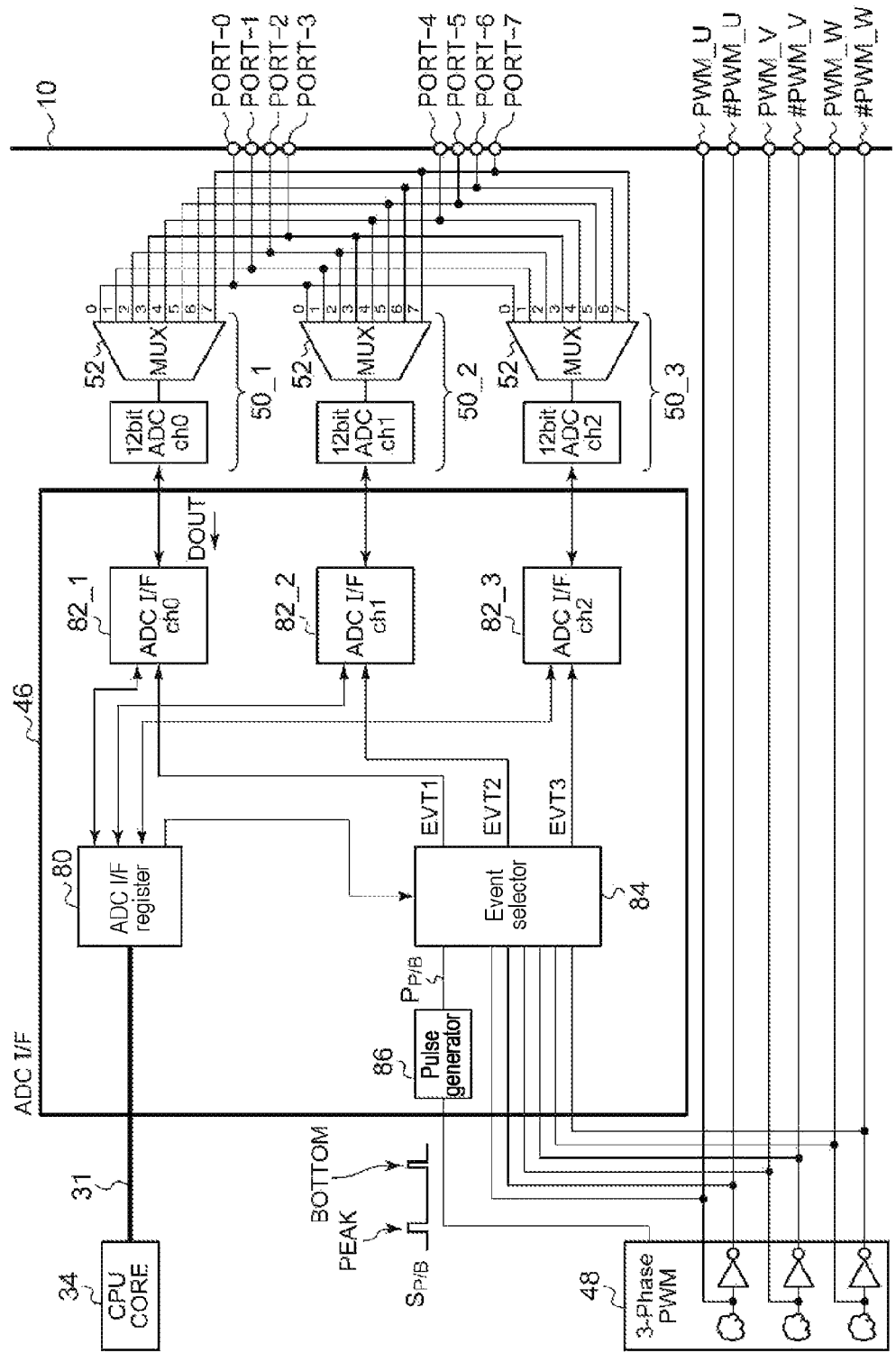
FIG. 3 is a detailed block diagram of a portion of the control circuit of FIG. 2.

FIG. 3 is a detailed block diagram of a portion of the control circuit 10 of FIG. 2. A configuration of the ADC interface 46 is shown in detail In FIG. 3. The ADC interface 46 includes an ADC I/F register (hereinafter, simply referred to as a register) 80, interface units 82_1 to 82_3, and an event selector 84. Each of the interface units 82 is provided for each channel and configured in the same way.

The ADC interface 46 operates in synchronization with the same system clock CLK_SYS (for example, 40 MHz) as the CPU core 34. On the other hand, a plurality of A/D converters 50 operates in synchronization with a clock CLK_IR of a conversion frequency operation range (for example, 16 MHz) of the A/D converters 50. The ADC interface 46 and the A/D converter 50 may be asynchronous.

Figure 4:
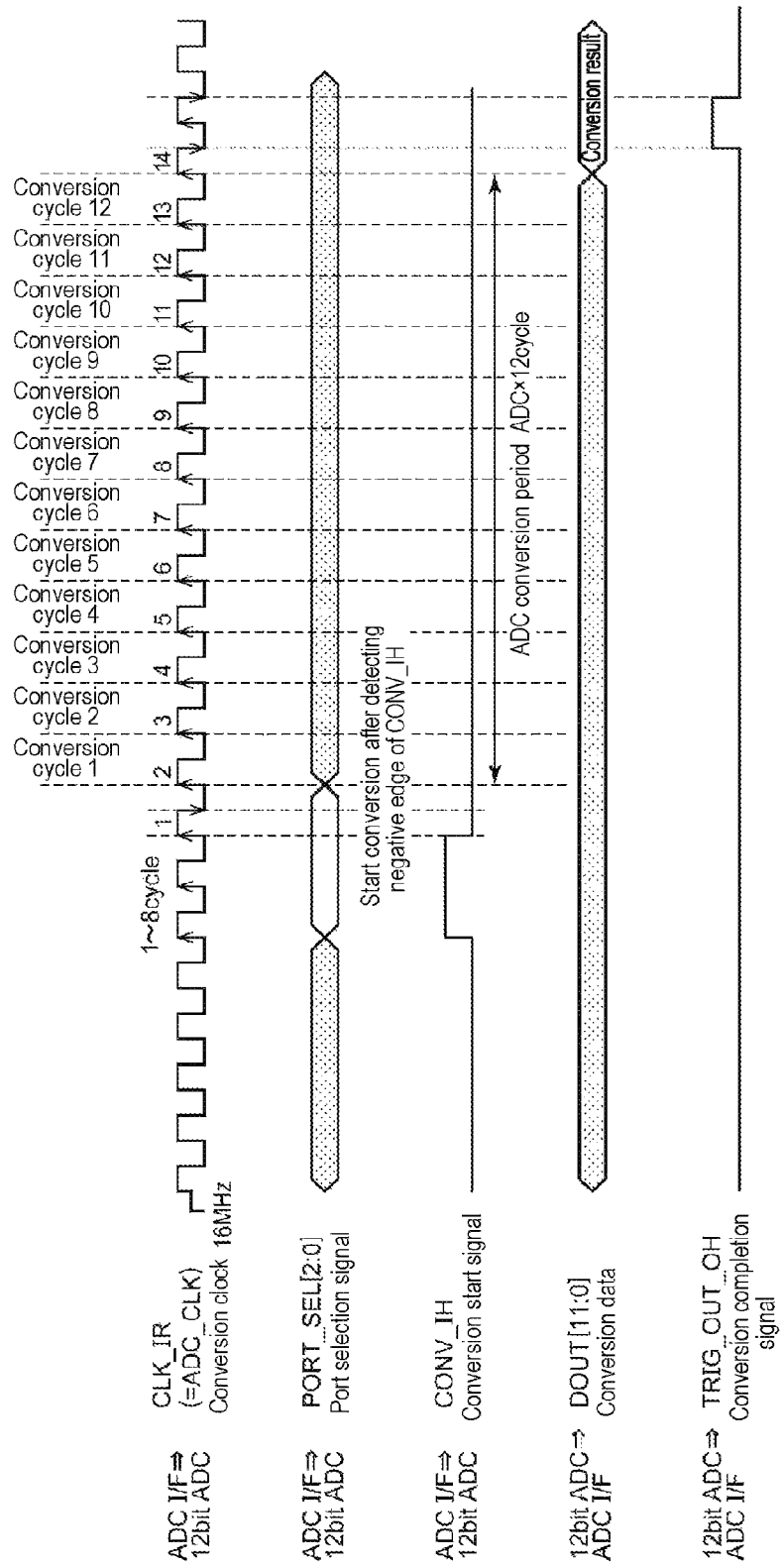
FIG. 4 is a view for explaining an interface between an ADC interface and an A/D converter.

FIG. 4 is a view for explaining the interface between the ADC interface 46 and the A/D converter 50. FIG. 4 shows an one-time conversion operation. The A/D converter 50 is, for example, of a 12-bit successive approximation type and requires 12 cycles of the clock CLK_IR for one conversion. Prior to the conversion, a port selection signal PORT_SEL [2:0] designating an analog port is given from the ADC interface 46 to the AiD converter 50. When a conversion start signal CONV_IH is asserted, the A/D conversion is started. When 12-bit conversion is completed after 2 cycles lapse, a conversion completion signal TRIG_OUT_OH is asserted and the 12-bit conversion data DOUT[11:0] becomes valid. The number of bits of the A/D converter 50 is not particularly limited. For example, the number of bits may be 10 or 8, or may be variable.

Returning to FIG. 3, the register 80 can be accessed from the CPU core 34 via the bus 31. The register 80 includes a data register and a control register for each channel. The conversion data DOUT generated by the A/D converter 50 of each channel is stored in a data register of that channel. The CPU core 34 accesses the data register to acquire digital values of the detection signals input to the plurality of analog ports PORT-0 to PORT-7. The operation of the A/D converter 50 of each channel is controlled based on a value written in the control register of the channel by the CPU core 34. Specifically, the ADC interface 46 controls the timing of the port selection signal PORT_SEL and the conversion start signal CONV_IH based on the value of the control register.

(Control Cycle)

Subsequently, a control cycle will be described. One control cycle of the A/D converter 50 by the ADC interface 46 includes k times (1≤k≤n) of the A/D conversion where n is the maximum (n is an integer of 2 or more). In this embodiment, n=8. In the following description, one channel will be explained.

In order to set the number of times k, the following control registers are provided.

Values of the control registers shown in the present specification are just examples and other values may be assigned. Names of the registers are just convenient.

Count Register (BURST_SEL)

000: k=1

001: k=2

~

111: k=8

A value designating a conversion number k is stored in the register BURST_SEL. The maximum value of the conversion number k is equal to n. That is, 1≤k≤n.

In other words, the A/D conversion is performed k times during one control period, so that k (up to 8) conversion data DOUT0 to DOUTk−1 are generated. DOUTi−1 represents $i^{th}$ conversion data and corresponds to DOUT [11:0] in FIG. 4. In order to store up to n conversion data DOUT0 to DOUTn−1, n data registers are provided.

Data Register (DATA0 to DATAn−1)

The number of data registers DATA is equal to the maximum number of conversions n. The n data registers (DATA0 to DATAn−1) store conversion data DOUT0 to DOUTn−1 for n times. The storage of the conversion data DOUT0 to DOUTn−1 is performed by an access controller 92 to be described later.

Port Selection Register (PORT_SEL0 to PORT_SELn−1)

000: First port PORT-0

001: Second port PORT-1

010: Third port PORT-2

~

110: Seventh port PORT-6

111: Eighth port PORT-7

In order to control the multiplexer 52, n (equal to the maximum conversion number) port selection registers are provided. A value Xi−1 of the $i^{th}$ port selection register PORT_SELi designates an analog port to be selected by the multiplexer 52 in the $i^{th}$ A/D conversion. When a value X3 of the port selection register PORT_SEL3 is 0, the first analog port PORT-0 is selected in the fourth A/D conversion.

Figure 5:
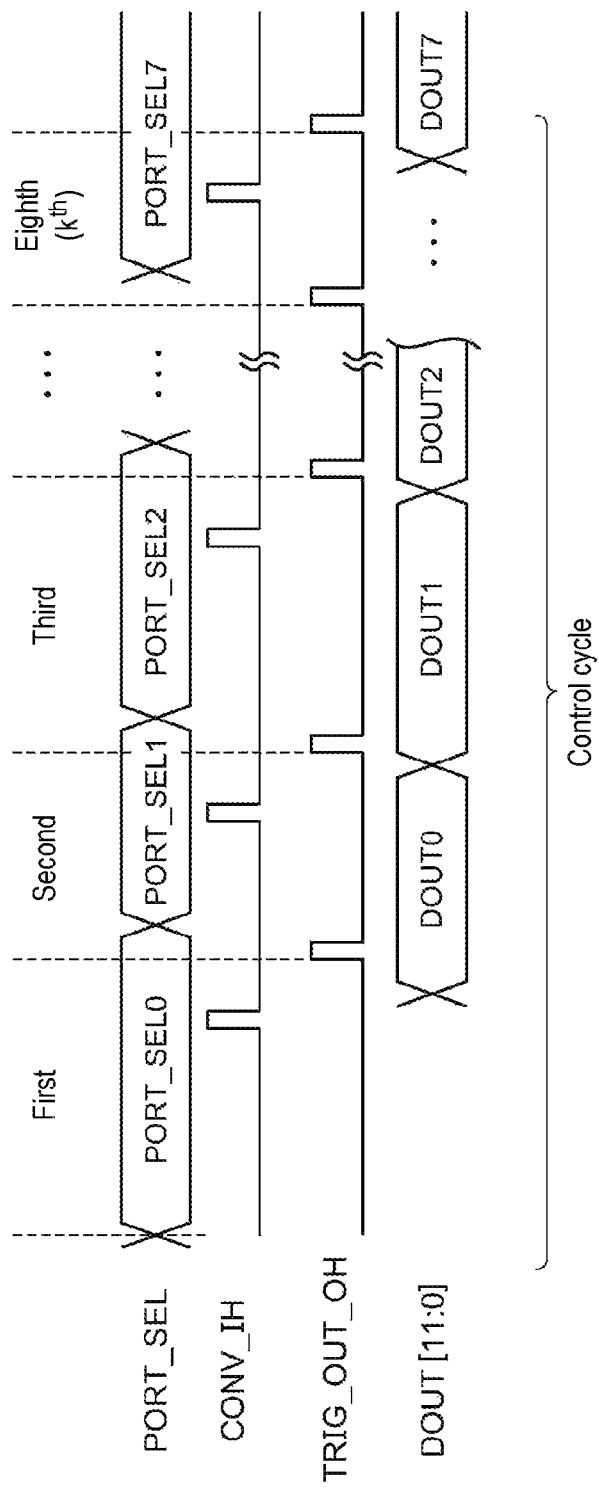
FIG. 5 is an operation waveform diagram of the A/D converter and the ADC interface during one control cycle.

FIG. 5 is an operation waveform diagram of the A/D converter 50 and the ADC interface 46 during one control cycle. First, prior to the first conversion, the value of the first port selection register PORT_SEL0 is set as the port selection signal PORT_SEL for the multiplexer 52. Subsequently, when the conversion start signal CONV_IH is asserted, the conversion is started. When the conversion is completed, the conversion end signal TRIG_OUT_OH is asserted and the first conversion data DOUT0 becomes valid. Subsequently, prior to the second conversion, the value of the second port selection register PORT_SEL1 is set as the port selection signal PORT_SEL for the multiplexer 52. Subsequently, when the conversion start signal CONV_IH is asserted, the conversion is started. When the conversion is completed, the conversion end signal TRIG_OUT_OH is asserted and the second conversion data DOUT1 becomes valid. When the same process is repeated k times, one control cycle is completed.

(Events)

Subsequently, returning to FIG. 3, events will be described. The control circuit 10 is configured to be controlled with various events occurring inside the control circuit 10 as triggers. A signal which is generated inside the control circuit 10 and has its edge (or level) indicating an occurrence of an event is called an internal signal.

In this embodiment, in the control circuit 10, at least one, preferably two or more, of the following events may be used.

U phase turn-on event
U phase turn-off event
V phase turn-on event
V phase turn-off event
W phase turn-on event
W phase turn-off event For example, in a case where the U phase turn-on and the U phase turn-off events are used, a U phase PWM signal PWM_U generated in the pulse width modulator 48 may be used as the internal signal with its positive and negative edges corresponding respectively to the U phase turn-on and the U shape turn-off. Alternatively, the inverted signal #PWM_U may be used as the internal signal with its negative and positive edges corresponding respectively to the U phase turn-on and the U phase turn-off. In the present specification, # indicates logical inversion.

Similarly, in a case where the V phase turn-on and V phase turn-off events are used, a V phase PWM signal PWM_V (or its inverted signal #PWM_V) may be used as the internal signal. In a case where the W phase turn-on and the W phase turn-off events are used, a W phase PWM signal PWM_W (or its inverted signal #PWM_W) may be used as the internal signal.

Further, in the control circuit 10, a peak (a mountain) and a bottom (a valley) of a triangular wave used in the pulse width modulator 48 may be used as the event.

PWM Triangular Wave Peak Event and Bottom Event

As an internal signal corresponding to the peak and the bottom, a peak/bottom detection signal $S_{P/B}$ indicating the peak and bottom of the triangular wave is supplied from the pulse width modulator 48 to the ADC interface 46. For example, the peak/bottom detection signal $S_{P/B}$ is asserted (for example, high level) in one cycle of the system clock CLK_SYS in each of the peak and the bottom.

A peak/bottom pulse generator 86 receives the peak/bottom detection signal $S_{P/B}$ and generates the peak/bottom pulse $P_{P/B}$ whose level transitions for each of the peak and the bottom.

Figure 6:
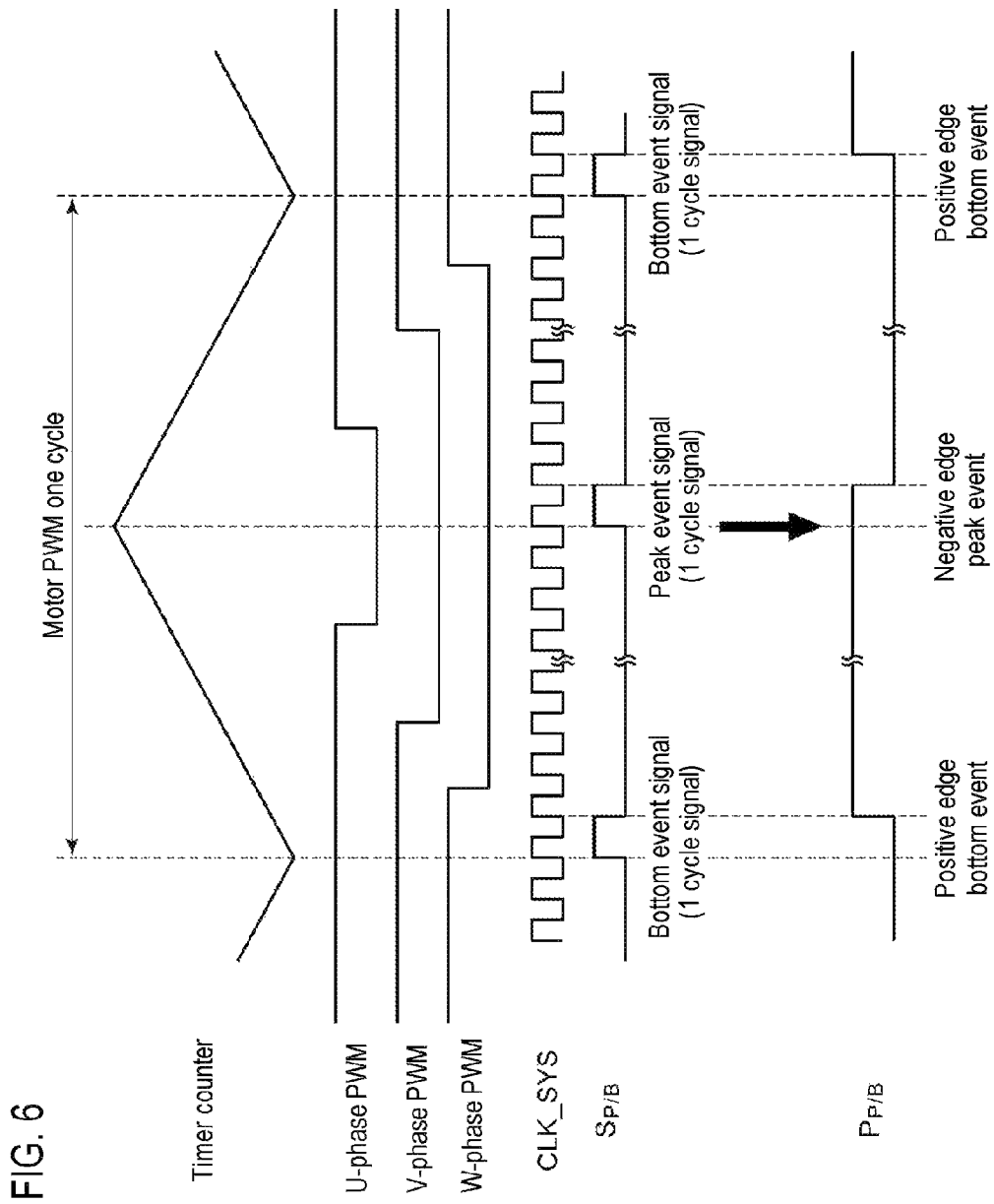
FIG. 6 is an operation waveform diagram of a pulse width modulator and a peak/bottom pulse generator.

FIG. 6 is an operation waveform diagram of the pulse width modulator 48 and the peak/bottom pulse generator 86. A timer counter in the pulse width modulator 48 generates a triangular wave of a PWM cycle and asserts (for example, high level) the peak-bottom detection signal $S_{P/B}$ in each of the peak and the bottom. The peak/bottom pulse generator 86 transitions the level of the peak/bottom pulse $P_{P/B}$ every time the peak/bottom detection signal $S_{P/B}$ is asserted. Like other internal signals (PWM_U to PWM_W), the peak/bottom pulse $P_{P/B}$ generated as described above become a pulse signal having a PWM cycle. Thus, the peak/bottom pulse $P_{P/B}$ and the internal signals may be treated equally.

Returning to FIG. 3, the event selector 84 selects one of a plurality of internal signals for each channel and supplies it as an event signal EVT to the corresponding interface unit 82. The internal signal used for the event signal EVT can be individually selected for each channel according to a value of the control register of the register 80.

In each channel, the interface unit 82 generates a timing signal TMG based on the event signal EVT from the event selector 84, and controls the operation of the A/D converter 50 according to the timing signal TMG This is called a hardware mode. As will be described later, it is also possible to control the A/D converter 50 independently of the event signal EVT, which is referred to as a software mode.

Figure 7:
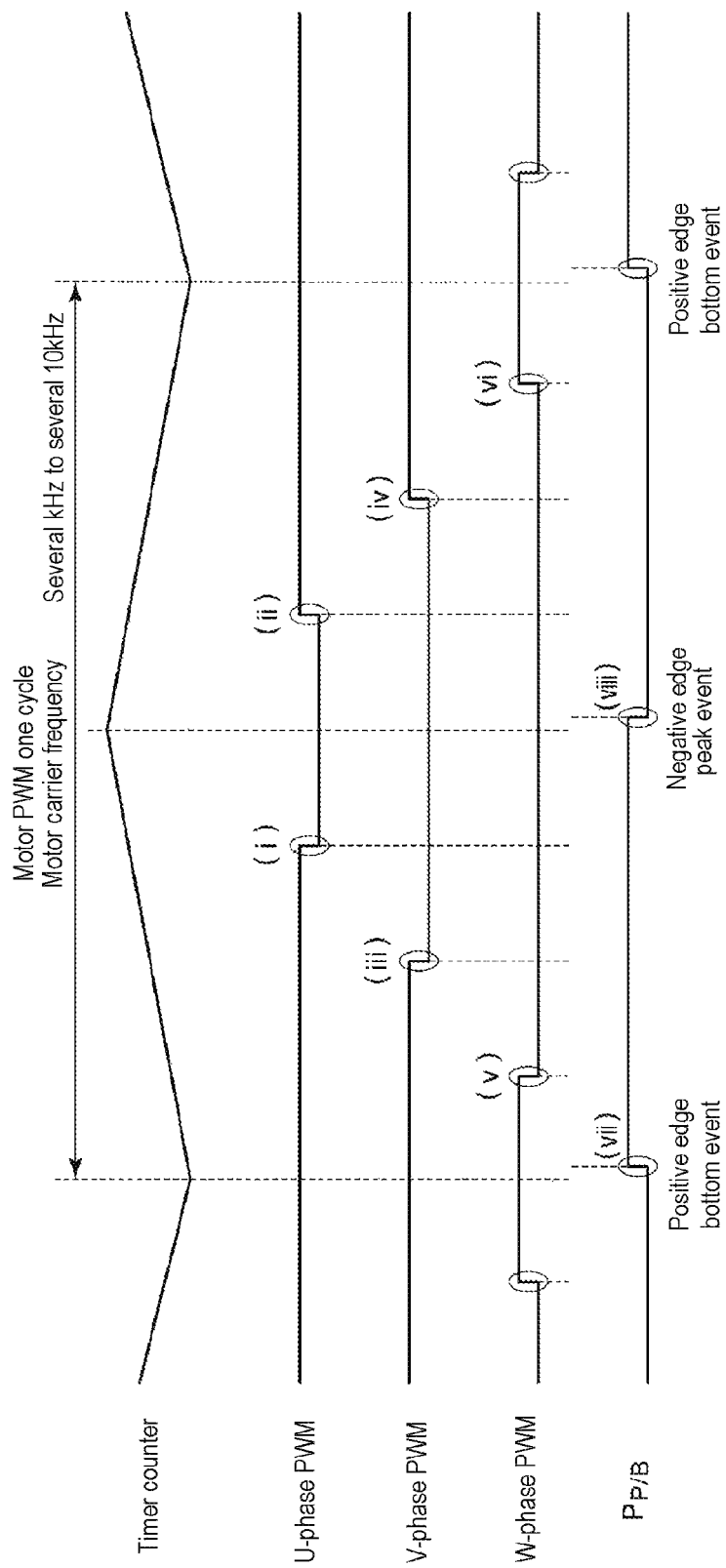
FIG. 7 is a diagram showing internal signals and events.

FIG. 7 is a diagram showing internal signals and events. As shown in FIG. 3, a plurality of internal signals PWM_U, PWM_V, PWM_W and a peak/bottom pulse $P_{P/B}$ are input to the ADC interface 46. Therefore, in each PWM cycle, eight events (i) to (viii) can be used for a timing control (specifically, a control of the start state and a conversion timing to be described later). In the related art described earlier, the operation timing of the A/D conversion is generated by a trigger generator configured as hardware. Therefore, software cannot be interposed for the timing control of the A/D converter, causing a lack in flexibility. In contrast, according to the present embodiment, it is possible to freely control the timing of the A/D converter 50 by using internal signals (events). This contributes to increasing a degree of freedom of the program or enhancing a controllability of the motor.

(Event Selector 84 and Interface Unit 82)

Figure 8:
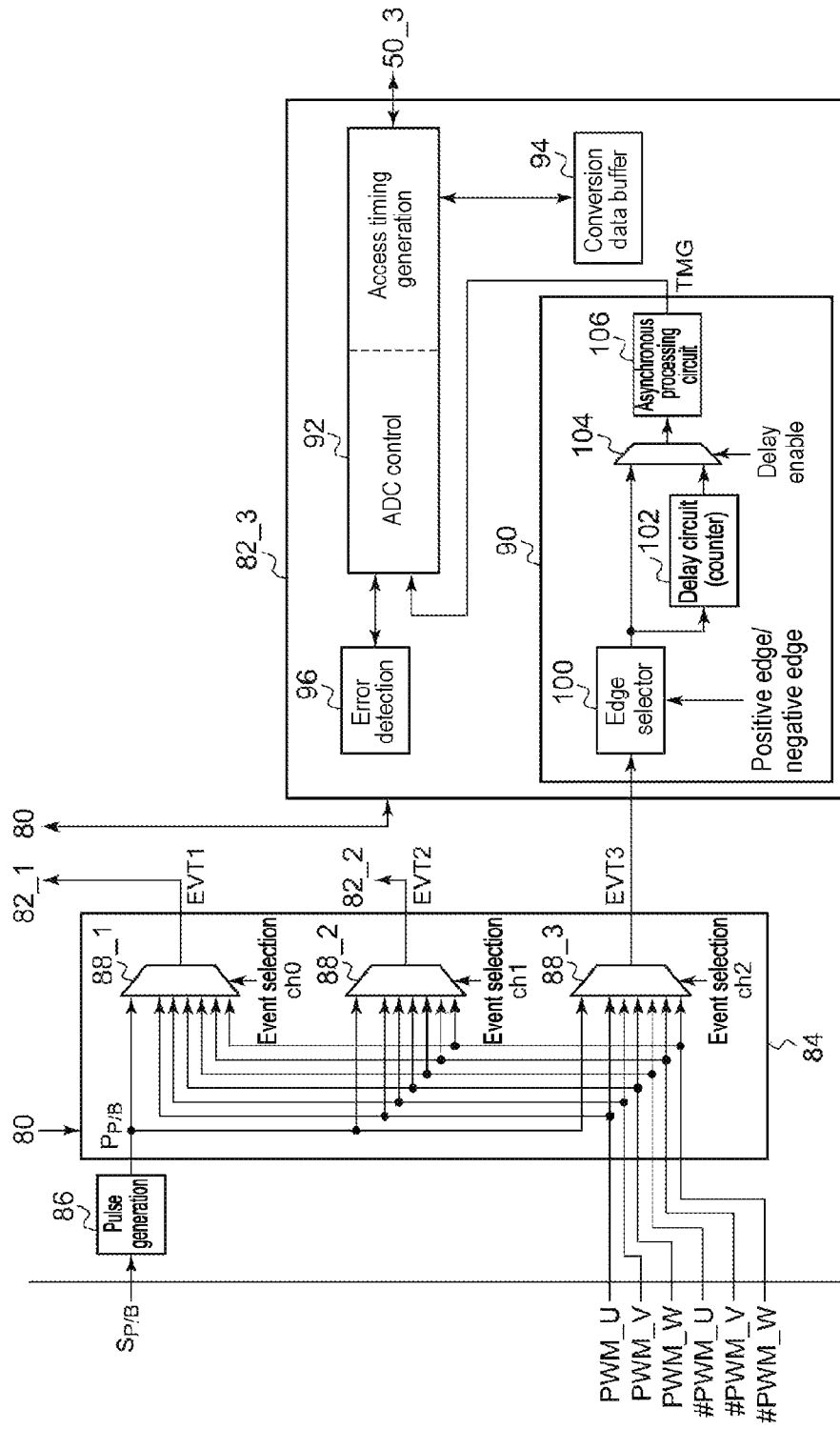
FIG. 8 is a block diagram illustrating a configuration example of an event selector and an interface unit.

FIG. 8 is a block diagram illustrating a configuration example of the event selector 84 and the interface unit 82. The event selector 84 includes selectors 88_1 to 88_3 each of which is provided for each channel. Each selector 88 selects an internal signal corresponding to a value stored in the corresponding control register to generate an event signal EVT, and outputs the generated event signal EVT to the corresponding interface unit 82.

Next, a configuration of the interface unit 82 will be described. Although only the configuration of the third channel ch2 is illustrated here, other channels are configured similarly. The interface unit 82 includes a timing signal generation circuit 90, an access controller 92, a conversion data buffer 94 and an error detector 96.

The timing signal generation circuit 90 generates the timing signal TMG based on the event signal EVT from the event selector 84. For example, the timing signal generation circuit 90 includes an edge selector 100, a delay circuit 102, a delay selector 104 and an asynchronous processing circuit 106.

As described above, the event signal EVT output from the event selector 84 is a pulse signal having a PWM cycle. The edge selector 100 detects one of the positive edge and the negative edge of the event signal EVT according to a value of the corresponding control register and cuts out the detected edge. In other words, one event corresponding to each of the positive edge and the negative edge is selected. The delay circuit 102 is configured using a counter and provides a delay according to the value of the corresponding control register to the cut-out edge signal. The delay selector 104 selects one of a delayed signal and an undelayed signal according to its corresponding control register. The asynchronous processing circuit 106 synchronizes an output of the delay selector 104 synchronized with the system clock CLK_SYS to the clock CLK_IR on the A/D converter side to generate the timing signal TMG The access controller 92 is mainly responsible for two operations. One is an operation (access timing generation) of controlling the conversion timing of the A/D converter 50 with the timing signal TMG as a trigger in the hardware mode. The other is an operation (ADC control) of storing the conversion data DOUT obtained from the A/D converter 50 in the data register DATA of the register 80.

The conversion data buffer 94 temporarily stores a digital value generated by the A/D converter 50. Based on a state of the access controller 92, the error detector 96 determines the presence/absence of abnormality in the A/D converter 50 and the interface unit 82. The error detector 96 detects, for example, the following error. At the time of error detection, a predetermined value (for example, 1) may be written in a register for error notification, and an interruption may be applied to the CPU core 34.

Event Error

An event error is determined to have occurred when an event occurs that newly triggers a start of the A/D conversion during the A/D conversion.

When controlling a motor, it is necessary to handle a high voltage. Therefore, when an unintended control is being performed, an appropriate protection processing such as detecting the unintended control quickly and stopping the motor is required. By implementing an operation of detecting the event error in the error detector 96, it is possible to quickly detect at a hardware level that a relationship of events input to the ADC interface 46 cannot be correctly controlled, thereby protecting a circuit. When designing the device 1, the detection of the event error is very useful for debugging a software or a hardware design.

Subsequently, the timing control of the A/D converter 50 will be described. In this embodiment, representative controllable timings of the control circuit 10 are:

(1) operation start timing, and
(2) k times A/D conversion timing.

Figure 9:
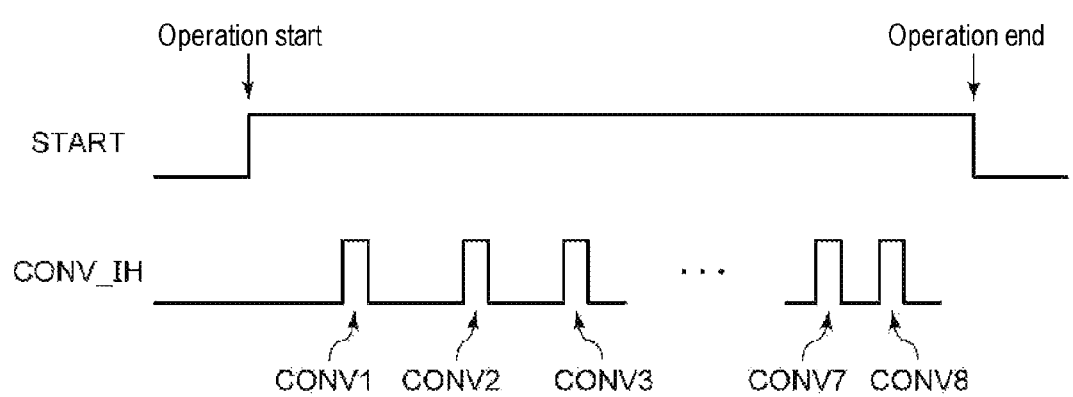
FIG. 9 is a diagram showing a control sequence of the A/D converter.

FIG. 9 is a diagram showing a control sequence of the A/D converter 50. The operation start corresponds to the start of one control cycle of the A/D converter 50 in a certain mode. When a start flag START rises in response to the operation start, the A/D converter 50 is enabled to execute the A/D conversion k times. In the control circuit 10 according to the embodiment, at least one of the operation start timing and the plurality of A/D conversion timings can be controlled by an event signal (a timing signal) obtained from the internal signal.

Various modes of the control circuit 10 can be switched. Modes of the control circuit 10 will be described below. Since the three channels ch0 to ch2 are the same, only one channel will be focused and described. The control register and the data register are provided for each channel.

<Buffer Mode and Normal Mode>

According to the embodiment, the control circuit 10 supports two modes, i.e., a buffer mode and a normal mode, one of which can be designated by a value of a register MODE_BUF. The two modes are different in terms of a method of storing the conversion data DOUT0 to DOUTn−1 in the data registers DATA0 to DATAn−1.

Mode Buffer Register (MODE_BUF)
Value 0: Normal mode
Value 1: Buffer mode

Figure 10A:
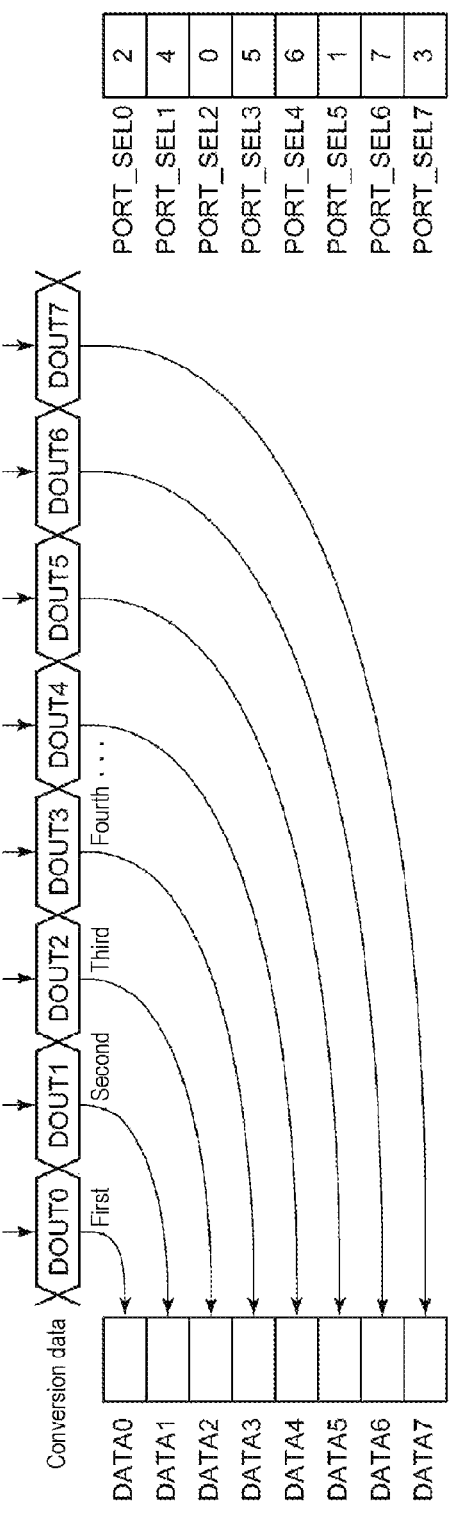
FIG. 10A is a diagram for explaining the operation of an access controller in a buffer mode.

FIG. 10A is a diagram for explaining the operation of the access controller 92 in the buffer mode. FIG. 10A also shows a port selection register. In the buffer mode, the $i^{th}$ (i=1 to 8) conversion data DOUTi−1 is stored in the $i^{th}$ data register DATAi−1. In this buffer mode, data are stored in n data registers in a time-series sequence of conversion. In the buffer mode, it is possible to designate the same analog port a plurality of times out of n times and acquire the data. With this in mind, a user only has to design software, achieving an easy programming.

Figure 10B:
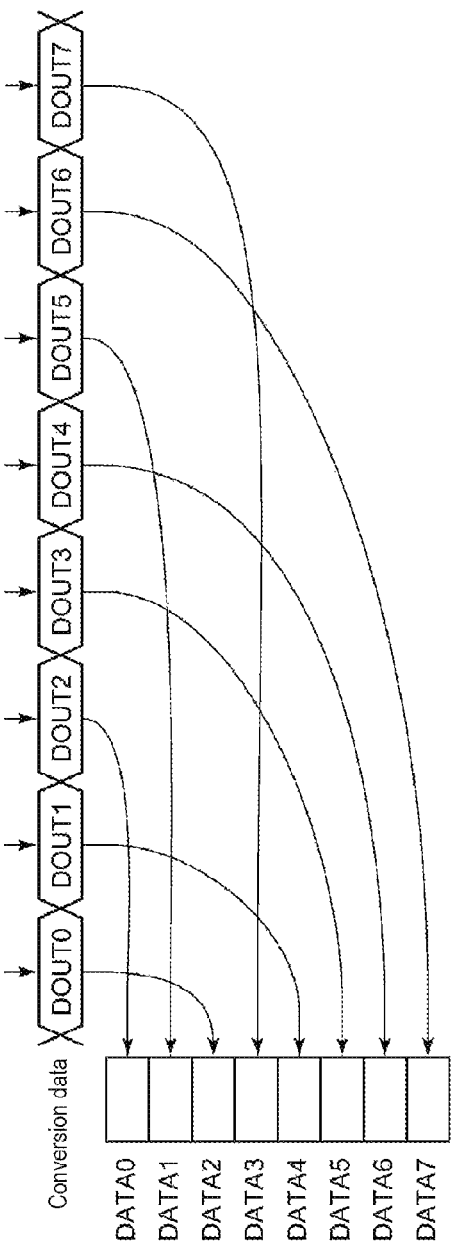
FIG. 10B is a diagram for explaining the operation of the access controller in a normal mode.

FIG. 10B is a diagram for illustrating an operation of the access controller 92 in the normal mode. The value of the port selection register is the same as in FIG. 10A. In the normal mode, the access controller 92 refers to the port selection registers PORT_SEL0 to PORT_SEL7 to determine a storage destination of the conversion data DOUT to DOUT7. More specifically, the access controller 92 stores the $i^{th}$ conversion data DOUTi−1 in the data register DATAj corresponding to the value of the corresponding port selection register PORT_SELi−1. For example, in FIG. 10B, attention is paid to the first conversion data DOUT0. Since the value of the corresponding port selection register PORT_SEL0 is 2, the conversion data DOUT0 is stored in the data register DATA2. Similarly, when paying attention to the second conversion data DOUT1, since the value of the corresponding port selection register PORT_SEL 1 is 4, the conversion data DOUT1 is stored in the data register DATA4.

That is, in the normal mode, the conversion data of the $i^{th}$ analog port PORT-i is stored in the $i^{th}$ data register DATAi−1. In the normal mode, data of one analog port can be acquired only once per one control cycle. Depending on the operations required for the control circuit 10, it is possible to select one of the normal mode and the buffer mode, providing a flexibility of software control.

<Hardware Mode and Software Mode>

Regarding the operation start, the hardware mode and the software mode to be described below are prepared. These modes can be designated by a value of a mode start register MODE_START.

Mode Start Register (MODE_START)
0: Software register
1: Hardware register

In the software mode, the operation start is generated by the software without depending on the state (that is, an internal signal or an event signal) of the hardware. A run register is provided to perform the operation start in software.

Run Register (RUN)
1: Operation start with write of 1

Specifically, when the CPU core 34 asserts the run register RUN (writing of 1) based on the software control, an operation of the A/D converter 50 is started with this assertion as a trigger.

In the hardware mode, after the run register RUN is asserted, an operation start occurs with a predetermined state of hardware as a trigger. Specifically, after 1 is written in the run register RUN, when a start event signal EVT_START from the event selector 84 is input, the operation of the A/D converter 50 is started with the start event signal EVT_START as a trigger. The start event signal EVT_START is one of the event signals output by the event selector 84.

In order to generate the start event signal EVT_START, the following control register is prepared.

Event Selection Register (EVENT_SEL)
0000: Select PWM_U
0001: Select PWM_V
0010: Select PWM_W
0011: Select #PWM_U
0100: Select #PWM_V
0101: Select #PWM_W
0110: Select $P_{P/B}$
0111: Select #$P_{P/B}$ The Event Selection Register designates an internal signal to be the start event signal EVT_START. The Event Selection Register is used to control the event selector 84 of FIG. 3 (the selector 88 of FIG. 8).

The interface unit 82 generates a start timing signal TMG_START based on the start event signal EVT_START. Regarding the generation of the start timing signal TMG_START, the following control register is prepared.

Edge Selection Register (EVENT_EDGE)
0: Positive edge
1: Negative edge

The edge selection register designates which of the positive edge and the negative edge of the internal signal is used to generate the start event signal EVT_START The edge selection register is used to control the edge selector 100 of FIG. 8.

An event (start event) that triggers the operation start is designated by a combination of the event selection register EVENT_SEL and the edge selection register EVENT_EDGE.

Delay Setting Register (EVENT_DELAY)

The delay setting resister designates a delay time from an assertion of the start event signal EVT_START to an assertion of the start timing signal TMG_START. This register is used to control the delay circuit 102 of FIG. 8.

Delay Enable Register (EVENT_DELAY_EN)

This register designates presence or absence of a delay of the start timing signal TMG_START. This register is used to control the delay selector 104 of FIG. 8.

Further, a stop register STOP is provided to release the operation start.

Stop Register (STOP)
1: Operation stop with write of 1 (release of start state)

The above is the explanation about the operation start.

<Auto Mode and Sequential Mode>

Subsequently, the conversion timing will be described. Two modes, i.e., an auto mode and a sequential mode, are prepared in association with the conversion timing, and the following control register is prepared for selecting one of the two modes.

Mode Sequence Register (MODE_SEQ)
0: Auto mode
1: Sequential mode (i) In the auto mode, the access controller 92 automatically executes the A/D conversion k times in one control cycle. That is, a plurality of conversion timings CONV0 to CON7 is automatically generated by the access controller 92 after the operation start.

(ii) In the sequential mode, the access controller 92 executes each A/D conversion k times in one control cycle each time an event occurs for each A/D conversion. More specifically, in the sequential mode, the event selector 84 of FIG. 8 sequentially generates conversion event signals EVT0 to EVT7, following the start event signal EVT_START.

Regarding the conversion event signals EVT0 to EVT7, the following control registers are prepared.

Individual Event Selection Register (EVENT_SEL0 to EVENT_SELn−1)

The individual event selection register designates internal signals to be the conversion event signals EVT0 to EVT7 respectively. This register has a value similar to EVENT_SEL and is used to control the event selector 84 of FIG. 3 (the selector 88 in FIG. 8).

Individual Edge Selection Register (EVENT_EDGE0 to EVENT_EDGE7)
0: Positive edge
1: Negative edge This register designates which of the positive edge and the negative edge of the internal signal is used to generate the conversion event signal EVT_CONV. This register is used to control the edge selector 100 of FIG. 8.

An event (conversion event) that triggers the $i^{th}$ A/D conversion is designated by a combination of the individual event selection register EVENT_SELi−1 and the individual edge selection register EVENT_EDGEi−1.

The timing signal generation circuit 90 of FIG. 8 generates conversion timing signals TMG0 to TMG7 based on the conversion event signals EVT0 to EVT7 from the register 80. Regarding the generation of the conversion timing signals TMG0 to TMG7, the following control registers are prepared.

Delay Setting Register (EVENT_DELAY0 to EVENT_DELAY7)

The delay setting register designates a delay time from an assertion of each conversion event signal EVTi to an assertion of the conversion timing signal TMGi. This register has a value similar to EVENT_DELAY and is used to control the delay circuit 102 of FIG. 8.

Delay Enable Register (EVENT_DELAY_EN0 to EVENT_DELAY_ENn−1)

This register designates the presence or absence of delay of each conversion event signal EVTi. This register has a value similar to EVENT_DELAY_EN0 and is used to control the delay selector 104 of FIG. 8.

In the auto mode, n times of the A/D conversion can be automatically performed at a timing generated by the interface unit 82, which is useful in a situation where the timing of the A/D conversion is not so severe. In the sequential mode (manual mode), the timing of each A/D conversion (conversion timing) can be individually manually designated, which makes it possible to cope with severe timing control.

<One-Time Conversion Mode and Continuous Conversion Mode)

The access controller 92 can select one of a one-time conversion mode and a continuous conversion mode to be described below. For switching between these modes, the following control register is provided.

Mode Burst Register (MODE_BURST)
0: One-time conversion mode
1: Continuous conversion mode (i) In the one-time conversion mode, when performing k times of the conversion process is completed, the access controller 92 takes an operation end. Once the start flag START of FIG. 9 is negated, the access controller 92 waits for the next operation start. In the software mode, the access controller 92 performs the operation start when a value is written in the next RUN register. In the hardware mode, the access controller 92 performs the operation start by writing of the RUN register and occurrence of a start event.

(ii) In the continuous conversion mode, when the conversion processing of one control cycle is completed, the access controller 92 transitions to the next control cycle without waiting for the next operation start. That is, even if one control cycle ends, the state where the start flag has risen is maintained.

In other words, in the one-time conversion mode, the operation start is required at every control cycle, whereas, in the continuous conversion mode, the operation start is required only for the first time. More flexibility is provided by making it possible to select one of the one-time conversion mode and the continuous conversion mode.

Figure 11:
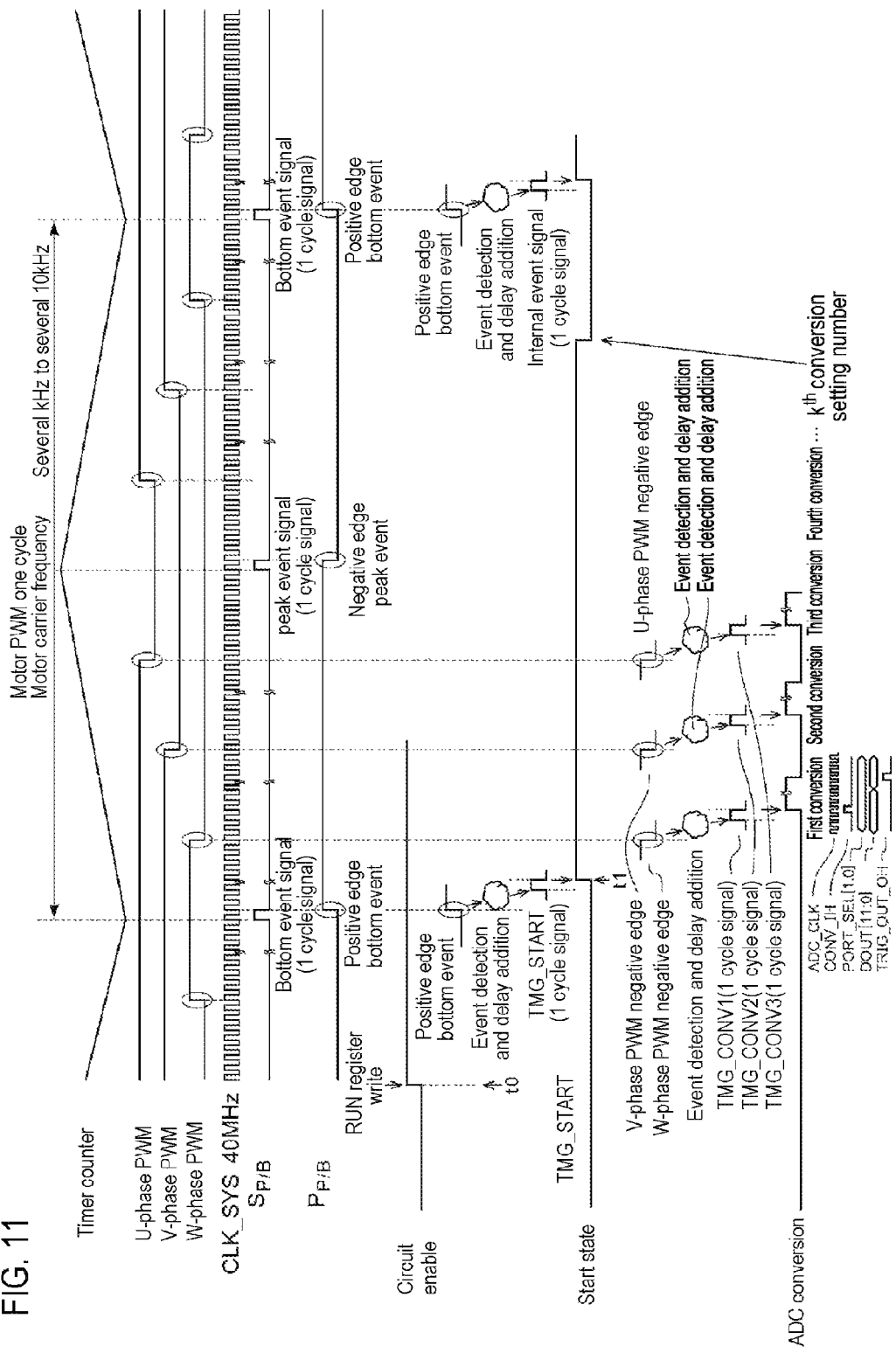
FIG. 11 is a waveform diagram showing a combination of a hardware mode and a sequential mode.

The modes supported by the control circuit 10 are described as above. Subsequently, the specific operation of the control circuit 10 will be described. FIG. 11 is a waveform diagram showing a combination of the hardware mode and the sequential mode. When 1 is written in the RUN register at time t0, the circuit is in an enable state, but it will not be in the start state in the hardware mode. Here, the bottom of the PWM (leading of the PWM period) is designated as a start event. In other words, the start timing signal TMG_START is generated based on the positive edge of the peak bottom pulse $P_{P/B}$, and the start state is set at time t1. By selecting the bottom event, the control cycle of the A/D converter can be synchronized with the PWM operation.

The first conversion takes a negative edge event of the W phase PWM signal as a trigger, the second conversion takes a negative edge event of the V phase PWM signal as a trigger, and the third conversion takes a negative edge event of the U phase PWM signal as a trigger. Then, in response to respective events, conversion timing signals TMG_CONV1 to TMG_CONV3 are generated respectively. This is equally applied to the subsequent conversions. Then, when the set number of times (k times) of the conversion is completed, the start flag is negated to become a non-start state. Then, when a transition to the next PWM cycle is performed, a start timing signal is generated in response to the bottom event and the start state is set again.

The present disclosure has been described above based upon the embodiments. The disclosed embodiments are illustrated only. It should be understood by those skilled in the art that various modifications to combinations of elements or processes may be made and such modifications fall within the scope of the present disclosure. Such modifications will be described below.

The number of phases of the motor is not particularly limited. The control circuit 10 may also be used for a method of directly monitoring the mechanical state of the motor using a resolver or a rotary encoder. In this case, a detection signal (a speed signal or a position signal) from the resolver may be input to one of analog ports.

According to the present disclosure in some embodiments, it is possible to provide easy and flexible software control.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A control circuit for a motor, comprising:
a plurality of m number of analog ports, each of which is operable to receive a respective detection signal indicating an electrical state of the motor as an input, m being an integer of 2 or more;
an A/D converter including a multiplexer configured to receive detection signals of the m number of analog ports and being configured to convert a detection signal selected by the multiplexer into a digital data;
a processor configured to generate a drive command of the motor based on the digital data;
a pulse width modulator configured to perform a pulse width modulation to generate a PWM signal based on the drive command; and
an interface circuit configured to be triggered by at least one internal signal generated in the control circuit to control an operation of the A/D converter according to a control command from the processor and deliver the digital data to the processor,
wherein the interface circuit includes:
a timing signal generation circuit configured to generate a timing signal based on the at least one internal signal; and
an access controller configured to control a timing of the A/D converter in response to the timing signal.

2. The control circuit of claim 1, wherein the at least one internal signal includes the PWM signal generated in the pulse width modulator.

3. The control circuit of claim 2, wherein the at least one internal signal includes a full-phase PWM signal generated in the pulse width modulator.

4. The control circuit of claim 3, wherein the at least one internal signal includes an inversion signal of the full-phase PWM signal.

5. The control circuit of claim 1, wherein the at least one internal signal includes a peak/bottom detection signal which has a predetermined level for one cycle at each of a peak and a bottom of a triangular wave used for the pulse width modulation.

6. The control circuit of claim 5, wherein the interface circuit includes:
a peak/bottom pulse generator configured to receive the peak/bottom detection signal and generate a pulsed peak/bottom pulse which transitions at each of the peak and the bottom of the triangular wave.

7. The control circuit of claim 1, wherein the at least one internal signal includes a pulsed peak/bottom pulse which transitions at each of a peak and a bottom of a triangular wave used for the pulse width modulation.

8. The control circuit of claim 1, wherein one control cycle of the A/D converter by the interface circuit includes k times (1≤k≤n) of an A/D conversion with n as a maximum, the n being an integer of 2 or more,
wherein the timing signal generation circuit is configured to generate a conversion timing signal based on a conversion event signal corresponding to one of the at least one internal signal for each A/D conversion; and
wherein the access controller is configured to control the A/D converter with the conversion timing signal as an A/D conversion trigger for each A/D conversion,
wherein the access controller performs each A/D conversion k times with the corresponding conversion timing signal as a trigger in a sequential mode.

9. The control circuit of claim 8, wherein the interface circuit further includes:
n number of individual event selection registers, each of which is configured to store a value individually designating an internal signal to be a trigger for each of the maximum n times of the A/D conversion; and
an event selector configured to receive a plurality of internal signals, select one of the plurality of internal signals corresponding to a value stored in the corresponding one of the n number of individual event selection registers for each A/D conversion, and output the conversion event signal, and
wherein the timing signal generation circuit generates the conversion timing signal based on the conversion event signal for each A/D conversion in the sequential mode.

10. The control circuit of claim 8, wherein the interface circuit further includes:
a delay setting register configured to store a setting value of delay time from an assertion of the conversion event signal to an assertion of the conversion timing signal for each of the maximum n times of the A/D conversion, and wherein the timing signal generation circuit includes:
a delay circuit configured to provide a delay according to the corresponding setting value of the delay setting register to the corresponding conversion event signal for each A/D conversion and outputs the conversion timing signal.

11. The control circuit of claim 8, wherein the interface circuit includes:
a mode sequence register configured to store a value designating one of an auto mode and the sequential mode, and
wherein the interface circuit automatically executes k times of the A/D conversion in the auto mode.

12. The control circuit of claim 8, wherein the interface circuit further includes:
a mode burst register configured to store a value designating one of a one-time conversion mode and a continuous conversion mode, and
wherein the access controller is further configured to wait for the next operation start when a conversion process of one control cycle is ended in the one-time conversion mode, and transitions to the next control cycle without waiting for the next operation start when a conversion process of one control cycle is ended in the continuous conversion mode.

13. The control circuit of claim 8, wherein the interface circuit further includes:
a register configured to store a value designating the number of times k of conversion included in the one control cycle.

14. The control circuit of claim 1 wherein the A/D converter is provided in each of a plurality of channels.

15. The control circuit of claim 1, wherein the control circuit is integrated on a single semiconductor substrate.

16. A fan comprising:
a fan motor: and
the control circuit of claim 1 configured to drive the fan motor.

17. A control circuit for a motor, comprising:
a plurality of m number of analog ports, each of which is operable to receive a respective detection signal indicating an electrical state of the motor as an input, m being an integer of 2 or more;
an A/D converter including a multiplexer configured to receive detection signals of the m number of analog ports and being configured to convert a detection signal selected by the multiplexer into a digital data;
a processor configured to generate a drive command of the motor based on the digital data;
a pulse width modulator configured to perform a pulse width modulation to generate a PWM signal based on the drive command; and
an interface circuit configured to be triggered by at least one internal signal generated in the control circuit to control an operation of the A/D converter according to a control command from the processor and deliver the digital data to the processor,
wherein the interface circuit includes an error detector configured to detect, as an event error, a trigger generated for newly starting an A/D conversion during a conversion by the A/D converter.

18. A control circuit for a motor, comprising:
a plurality of m number of analog ports, each of which is operable to receive a respective detection signal indicating an electrical state of the motor as an input, m being an integer of 2 or more;
an A/D converter including a multiplexer configured to receive detection signals of the m number of analog ports and being configured to convert a detection signal selected by the multiplexer into a digital data;
a processor configured to generate a drive command of the motor based on the digital data;
a pulse width modulator configured to perform a pulse width modulation to generate a PWM signal based on the drive command; and
an interface circuit configured to be triggered by at least one internal signal generated in the control circuit to control an operation of the A/D converter according to a control command from the processor and deliver the digital data to the processor,
wherein the interface circuit includes:
a timing signal generation circuit configured to generate a start timing signal based on a start event signal which is one of the at least one internal signal; and
an access controller configured to control the A/D converter by using the start timing signal as a trigger for an operation start of the A/D converter,
wherein the access controller uses the start timing signal as the trigger for the operation start of the A/D converter in a hardware mode.

19. The control circuit of claim 18, wherein the interface circuit further includes:
a run register; and
a mode start register configured to store a value designating one of a software mode and the hardware mode,
wherein the access controller uses an assertion of the run register as the trigger for the operation start of the A/D converter in the software mode, and uses the start timing signal as the trigger for the operation start of the A/D converter in the hardware mode.

20. The control circuit of claim 18, wherein the interface circuit further includes:
an event selection register; and
an event selector configured to receive a plurality of internal signals, select one of the plurality of internal signals corresponding to a value stored in the event selection register, and output the start event signal,
wherein the timing signal generation circuit generates the start timing signal based on the start event signal.

21. The control circuit of claim 18, wherein the interface circuit further includes:
a delay setting register configured to store a setting value of a delay time from an assertion of the start event signal to an assertion of the start timing signal in the hardware mode, and
wherein the timing signal generation circuit includes:
a delay circuit configured to provide a delay corresponding to the setting value of the delay setting register to the start event signal and output the start timing signal.

* * * * *